US012033385B2

United States Patent
Nam et al.

(10) Patent No.: US 12,033,385 B2
(45) Date of Patent: Jul. 9, 2024

(54) DISPLAY DEVICE (71) Applicant: LG ELECTRONICS INC., Seoul (KR)

(72) Inventors: Yeonoh Nam, Seoul (KR); Myongyoung Lee, Seoul (KR); Sangchurl Nam, Seoul (KR); Jongmin Park, Seoul (KR); Chungbin Im, Seoul (KR); Seokpan Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/904,476

(22) PCT Filed: Feb. 27, 2020

(86) PCT No.: PCT/KR2020/002836
§ 371 (c)(1),
(2) Date: Aug. 17, 2022

(87) PCT Pub. No.: WO2021/172623
PCT Pub. Date: Sep. 2, 2021

(65) Prior Publication Data
US 2023/0109234 A1    Apr. 6, 2023

(51) Int. Cl.
*G06V 20/40* (2022.01)
*H04N 21/485* (2011.01)

(52) U.S. Cl.
CPC ......... *G06V 20/41* (2022.01); *H04N 21/4854* (2013.01); *H04N 21/4852* (2013.01)

(58) Field of Classification Search
CPC ............... G06V 20/41; H04N 21/4854; H04N 21/4852; H04N 21/44008; H04N 21/84; G06F 18/00
See application file for complete search history.

(56) References Cited

U.S. PATENT DOCUMENTS

| 2010/0110300 A1 | 5/2010 | Ueno et al. |
| 2012/0206493 A1* | 8/2012 | Koike ................. H04N 21/431 345/660 |

(Continued)

FOREIGN PATENT DOCUMENTS

| KR | 1020150104347 | 9/2015 |
| KR | 1020170119214 | 10/2017 |

(Continued)

OTHER PUBLICATIONS

PCT International Application No. PCT/KR2020/002836, International Search Report dated Nov. 13, 2020, 2 pages.

(Continued)

*Primary Examiner* — Kunal Langhnoja
(74) *Attorney, Agent, or Firm* — LEE, HONG, DEGERMAN, KANG & WAIMEY (57) ABSTRACT

The present disclosure relates to a display device which displays an image with optimal picture quality according to genre. The display device may comprise: a control unit which determines the genre of an image; and a display unit which displays the image, the picture quality of which is adjusted according to the genre determined by the control unit, wherein the control unit may analyze an input image and classify the genre thereof, and revise the classified genre on the basis of a current scene.

8 Claims, 8 Drawing Sheets

(56) References Cited

U.S. PATENT DOCUMENTS

2015/0256891 A1\* 9/2015 Kim .................. H04N 5/602
                                                                725/39
2020/0304883 A1\* 9/2020 Choi ............... H04N 21/44231

FOREIGN PATENT DOCUMENTS

| KR | 1020190051219 | 5/2019 |
| KR | 101999607 | 7/2019 |
| WO | 2020108474 | 6/2020 |

OTHER PUBLICATIONS

U.S. Appl. No. 17/612,029, Office Action dated Dec. 23, 2022, 17 pages.

\* cited by examiner

DISPLAY DEVICE

CROSS-REFERENCE TO RELATED APPLICATION(S)

This application is the National Stage filing under 35 U.S.C. 371 of International Application No. PCT/KR2020/002836, filed on Feb. 27, 2020, the contents of which are all incorporated by reference herein in its entirety.

TECHNICAL FIELD

The present disclosure relates to a display device, and more particularly to a display device for displaying an image with optimal picture quality according to a genre.

BACKGROUND ART

The resolution of a display device refers to the number of pixels included in each side of a screen.

With the development of technology, the resolution has continuously increased, and the higher the resolution, the clearer the image is expressed. However, as the number of pixels increases, data constituting the pixels also increases, and thus more storage spaces are required and data processing speed increases.

Accordingly, the display device provides various image modes to appropriately implement the screen according to the genre of the image. For example, the display device provides a clear image mode for displaying the screen more clearly, a sports mode for expressing fast movements clearly, and an eco mode for reducing power consumption. The display device provides appropriate picture quality to an image by differently adjusting gradation, color balance, color reproducibility, contrast, etc. according to an image mode.

In order to minimize inconvenience of a user changing an image mode for each image, there is a need for a method for automatically changing picture quality according to the genre of the image. However, in this case, there is a problem in that the detection accuracy of the image genre is lowered, and the picture quality is consistently changed according to the genre even though each user has preferred picture quality.

DISCLOSURE

Technical Problem

The present disclosure provides a display device and an operation method thereof for more accurately determining a genre of an image.

The present disclosure provides a display device and an operation method thereof for flexibly adjusting picture quality by applying preference of a user.

Technical Solution

A display device according to an present disclosure comprises a controller configured to determine a genre of an image, and a display configured to display an image with picture quality being adjusted according to the genre determined by the controller, wherein the controller analyzes a received image to classify a genre and corrects the classified genre based on a current scene.

When the current scene corresponds to an unstable classification condition, the controller corrects the classified genre.

When determining that the current scene is in a static state, the controller recognizes that the current scene corresponds to the unstable classification condition.

When a dynamic range (DR) of the current scene is smaller than a preset reference value, the controller recognizes that the current scene corresponds to the unstable classification condition.

When correcting the classified genre, the controller corrects the genre of the image to a previously determined genre.

When correcting the classified genre, the controller corrects the genre of the image to a preset default genre.

In a state in which picture quality is preset by a user, the controller determines a picture quality adjustment range based on the preset picture quality.

The controller determines the picture quality adjustment range to be higher as the preset picture quality is improved.

In a state in which picture quality is preset by a user, the controller corrects a picture quality enhancement degree to be adjusted based on the preset picture quality.

The controller adjusts picture quality information of a genre having lowest picture quality to be higher as the preset picture quality is improved.

Advantageous Effects

According to the present disclosure, the reliability of a product may be advantageously improved by predicting the instability of genre classification and correcting the genre as well as classifying the genre based on an image signal to more accurately determine the genre of the image.

According to the present disclosure, when a user pre-sets picture quality, the picture quality of an image may be adjusted based on the set picture quality, and thus user satisfaction may be advantageously increased compared with the case in which picture quality is consistently adjusted according to a genre.

BEST MODE

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Terms including an ordinal number, such as first, second, etc., may be used to describe various elements, but the elements are not limited by the terms. The terms are used only for the purpose of distinguishing one component from another.

Figure 1:
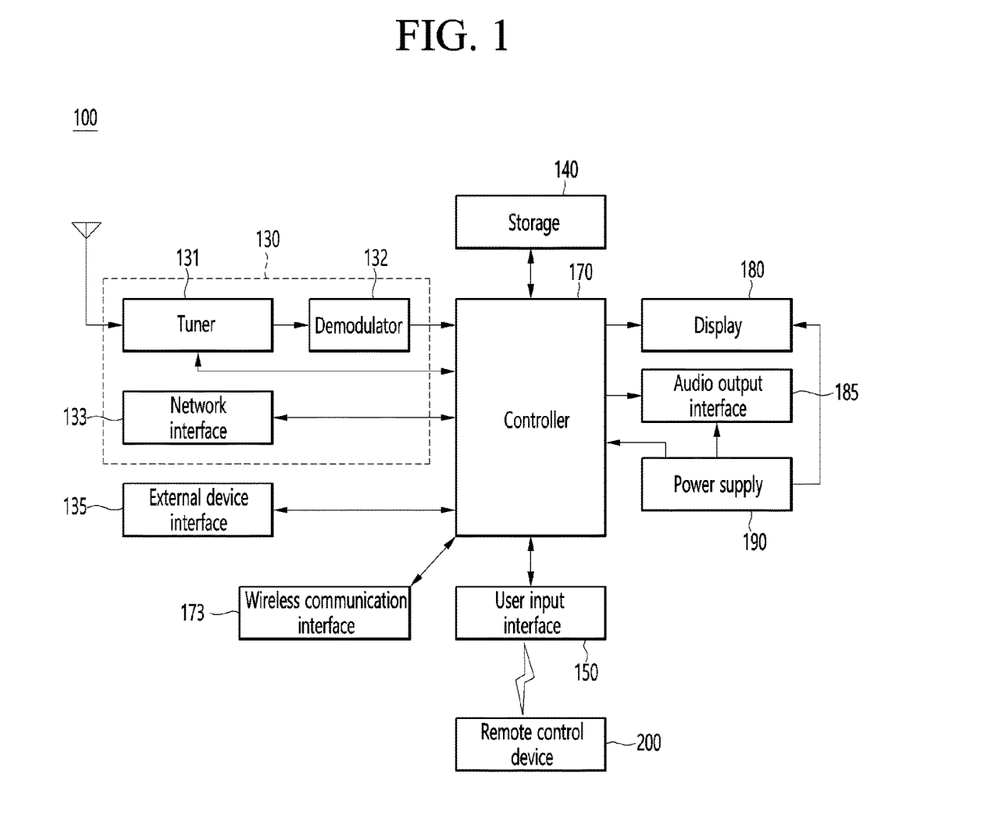
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface 135, a storage 140, a user input interface 150, a controller 170, a wireless communication interface 173, a display 180, an audio output interface 185, and a power supply 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The network interface 133 may provide an interface for connecting the display device 100 to a wired/wireless network including internet network. The network interface 133 may transmit or receive data to or from another user or another electronic device through an accessed network or another network linked to the accessed network.

The network interface 133 may access a predetermined webpage through an accessed network or another network linked to the accessed network. That is, it may transmit or receive data to or from a corresponding server by accessing a predetermined webpage through network.

Then, the network interface 133 may receive contents or data provided from a content provider or a network operator. That is, the network interface 133 may receive contents such as movies, advertisements, games. VODs. and broadcast signals, which are provided from a content provider or a network provider, through network and information relating thereto.

Additionally, the network interface 133 may receive firmware update information and update files provided from a network operator and transmit data to an internet or content provider or a network operator.

The network interface 133 may select and receive a desired application among applications open to the air, through network.

The external device interface 135 may receive an application or an application list in an adjacent external device and deliver it to the controller 170 or the storage 140.

The external device interface 135 may provide a connection path between the display device 100 and an external device. The external device interface 135 may receive at least one of image and audio outputted from an external device that is wirelessly or wiredly connected to the display device 100 and deliver it to the controller. The external device interface 135 may include a plurality of external input terminals. The plurality of external input terminals may include an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the audio output interface 185.

An external device connectable to the external device interface 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage 140 may store signal-processed image, voice, or data signals stored by a program in order for each signal processing and control in the controller 170.

Additionally, the storage 140 may perform a function for temporarily store image, voice, or data signals outputted from the external device interface 135 or the network interface 133 and may store information on a predetermined image through a channel memory function.

The storage 140 may store an application or an application list inputted from the external device interface 135 or the network interface 133.

The display device 100 may play content files (for example, video files, still image files, music files, document files, application files, and so on) stored in the storage 140 and provide them to a user.

The user input interface 150 may deliver signals inputted from a user to the controller 170 or deliver signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 may deliver, to the controller 170, control signals inputted from local keys (not shown) such as a power key, a channel key, a volume key, and a setting key.

Image signals that are image-processed in the controller 170 may be inputted to the display 180 and displayed as an image corresponding to corresponding image signals. Additionally, image signals that are image-processed in the controller 170 may be inputted to an external output device through the external device interface 135.

Voice signals processed in the controller 170 may be outputted to the audio output interface 185. Additionally, voice signals processed in the controller 170 may be inputted to an external output device through the external device interface 135.

Besides that, the controller 170 may control overall operations in the display device 100.

Additionally, the controller 170 may control the display device 100 by a user command or internal program inputted through the user input interface 150 and download a desired application or application list into the display device 100 in access to network.

The controller 170 may output channel information selected by a user together with processed image or voice signals through the display 180 or the audio output interface 185.

Additionally, according to an external device image playback command received through the user input interface 150, the controller 170 may output image signals or voice signals of an external device such as a camera or a camcorder, which are inputted through the external device interface 135, through the display 180 or the audio output interface 185.

Moreover, the controller 170 may control the display 180 to display images and control broadcast images inputted through the tuner 131, external input images inputted through the external device interface 135, images inputted through the network interface, or images stored in the storage 140 to be displayed on the display 180. In this case, an image displayed on the display 180 may be a still image or video and also may be a 2D image or a 3D image.

Additionally, the controller 170 may play content stored in the display device 100, received broadcast content, and external input content inputted from the outside, and the content may be in various formats such as broadcast images, external input images, audio files, still images, accessed web screens, and document files.

Moreover, the wireless communication interface 173 may perform a wired or wireless communication with an external electronic device. The wireless communication interface 173 may perform short-range communication with an external device. For this, the wireless communication interface 173 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless communication interface 173. Accordingly, a user of the wearable device may use the data processed in the display device 100 through the wearable device.

The display 180 may convert image signals, data signals, or OSD signals, which are processed in the controller 170, or images signals or data signals, which are received in the external device interface 135, into R. G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents inputted from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

Figure 2:
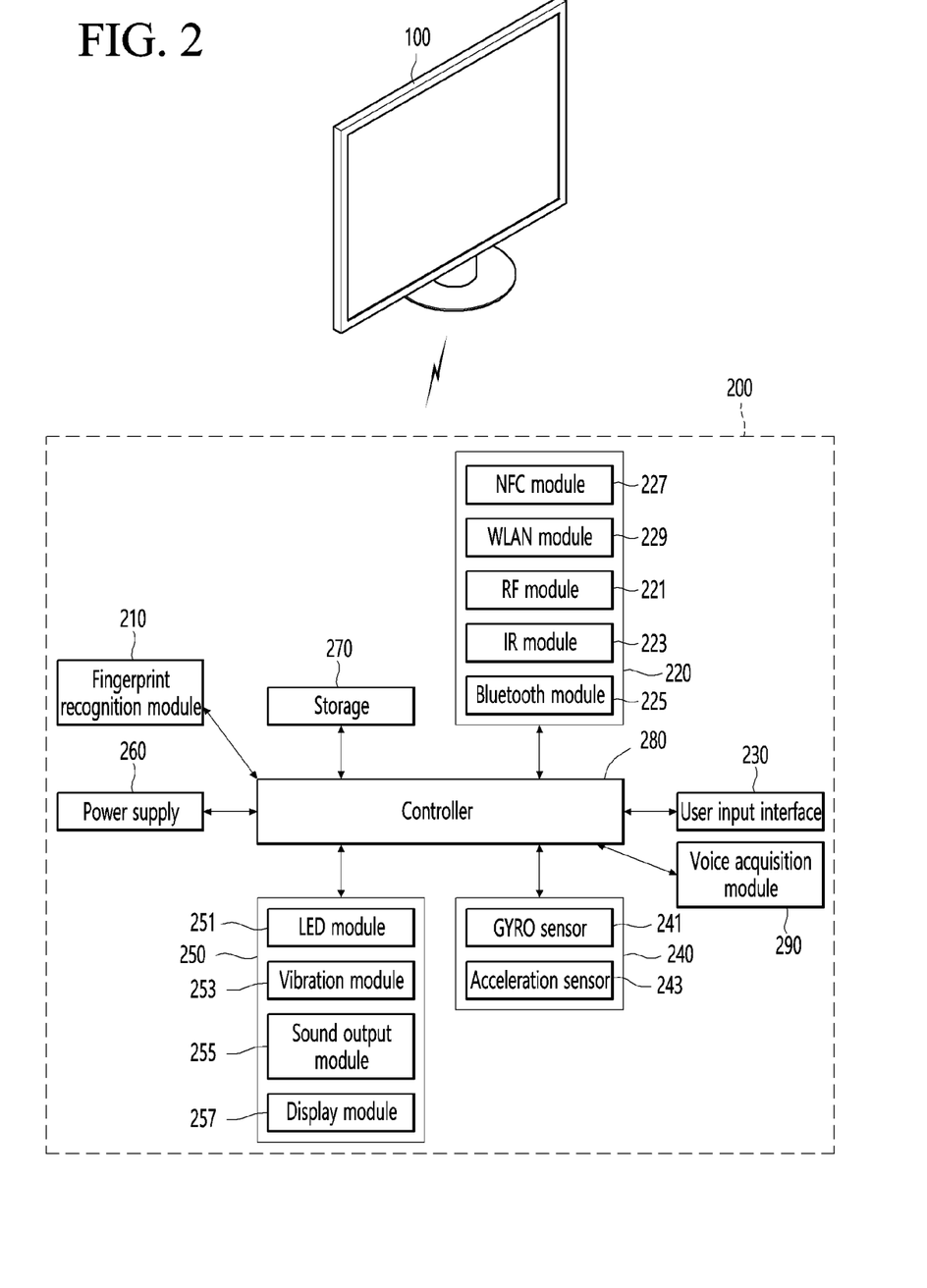
FIG. 2 is a block diagram illustrating a remote control device according to an embodiment of the present disclosure.
Figure 3:
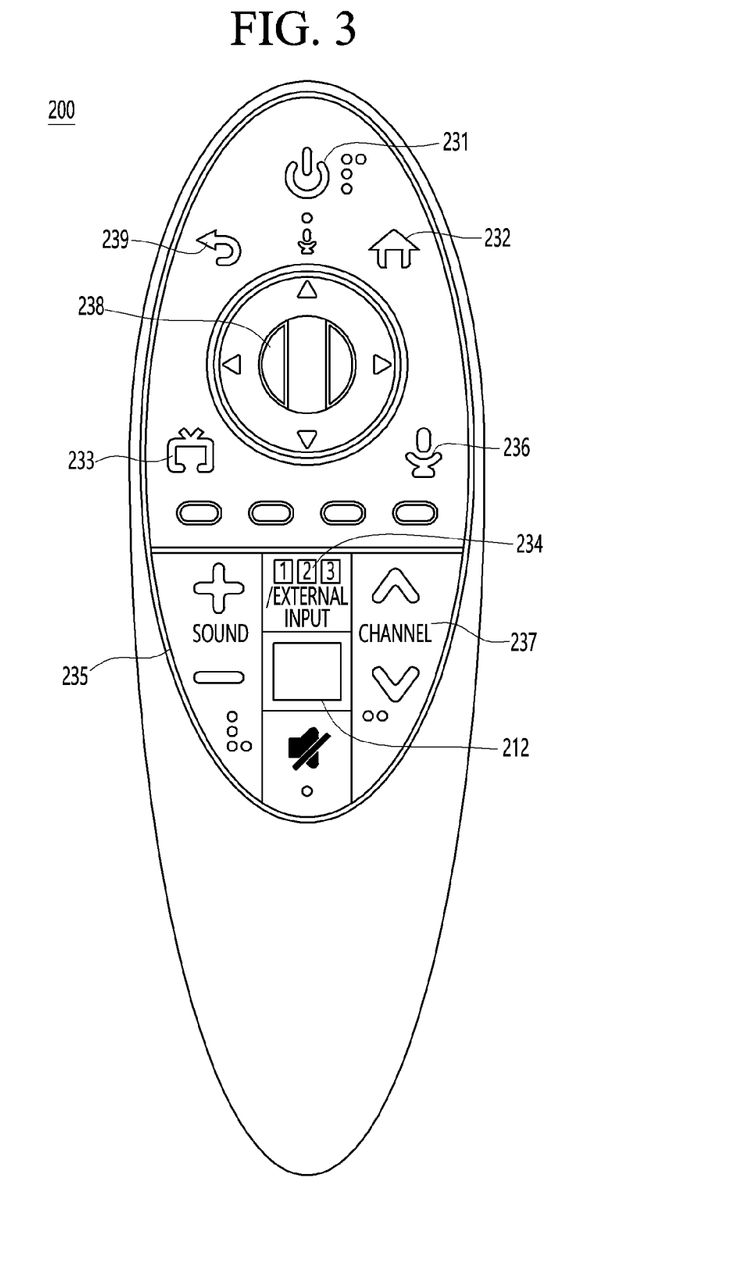
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 may transmit signals containing information on a movement of the remote control device 200 to the display device 100 through the wireless communication interface 220.

Moreover, the remote control device 200 may receive signals transmitted from the display device 100 through the RF module 221 and if necessary, may transmit a command on power on/off, channel change, and volume change to the display device 100 through the IR module 223.

The user input interface 230 may be configured with a keypad button, a touch pad, or a touch screen. A user may manipulate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The power button 231 may be button for moving to the home screen of the display device 100. The live button 233 may be a button for displaying live broadcast programs. The external input button 234 may be button for receiving an external input connected to the display device 100. The voice adjustment button 235 may be button for adjusting the size of a volume outputted from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 is described.

If the user input interface 230 includes a touch screen, a user may touch a soft key of the touch screen to input a command relating to the display device 100 to the remote control device 200. Additionally, the user input interface 230 may include various kinds of input means manipulated by a user, for example, a scroll key and a jog key, and this embodiment does not limit the scope of the present disclosure.

The sensor 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display 180 of the display device 100.

The output interface 250 may output image or voice signals corresponding to a manipulation of the user input interface 230 or corresponding to signals transmitted from the display device 100. A user may recognize whether the user input interface 230 is manipulated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste may be reduced. The power supply 260 may resume the power supply if a predetermined key provided at the remote control device 200 is manipulated.

The storage 270 may store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to a control of the remote control device 200. The controller 280 may transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 may obtain voice.

The voice acquisition module 290 may include at least one microphone 291 and obtain voice through the microphone 291.

Figure 4:
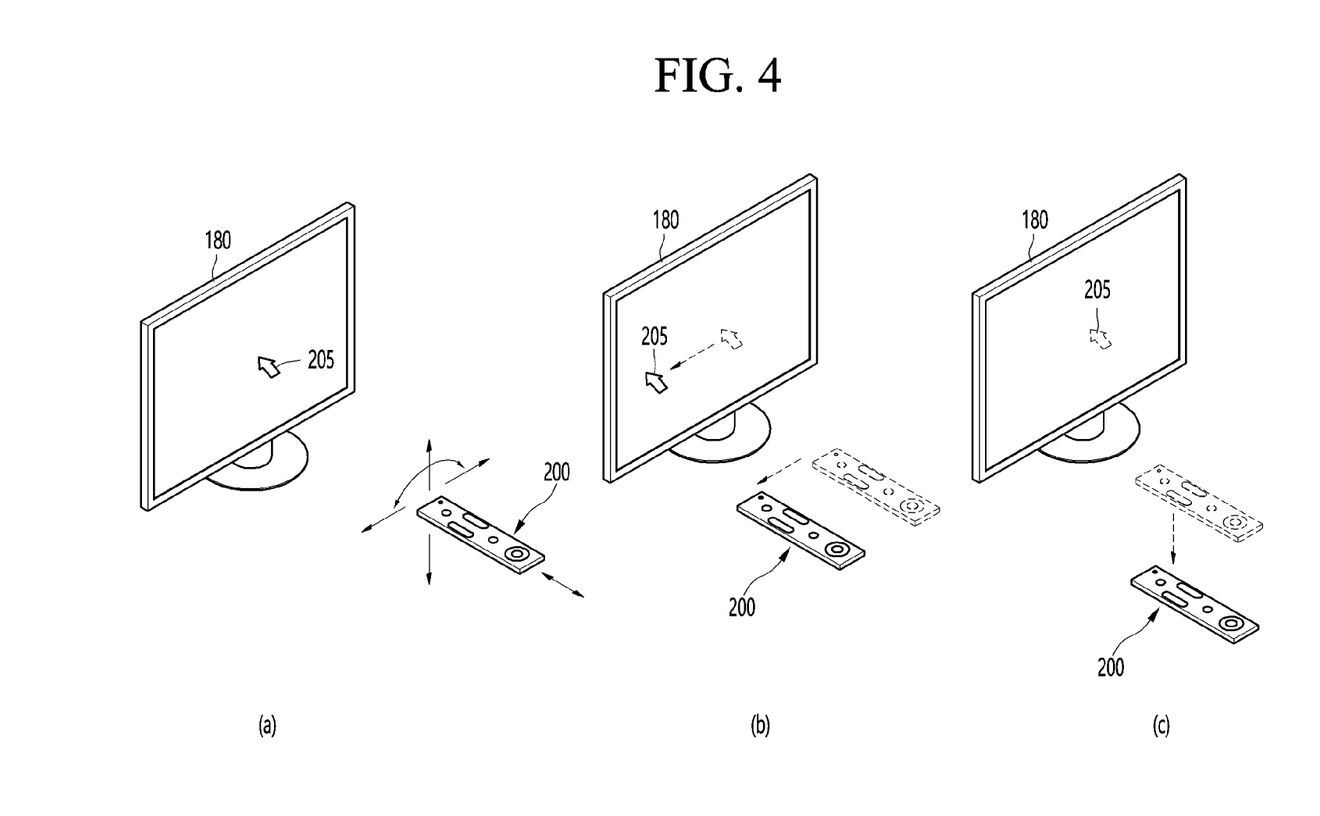
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 may be zoomed in and displayed largely.

On the other hand, if a user moves the remote control device 200 close to the display 180, a selection area in the display 180 corresponding to the pointer 205 may be zoomed out and displayed reduced.

On the other hand, if the remote control device 200 is away from the display 180, a selection area may be zoomed out and if the remote control device 200 is close to the display 180, a selection area may be zoomed in.

Additionally, if a specific button in the remote control device 200 is pressed, the recognition of a vertical or horizontal movement may be excluded. That is, if the remote control device 200 is moved away from or close to the display 180, the up, down, left, or right movement cannot be recognized and only the back and fourth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

The display device 100 may provide a function of adjusting picture quality of an image displayed through the display 180.

The picture quality (PQ) may refer to the quality of an image and may be determined based on gradation, color balance, color reproducibility, contrast, or the like.

The picture quality expected by the user may be changed according to the genre of the image. For example, a user may want to watch a sports image clearly by increasing the brightness and contrast, whereas the user may want to watch a drama or entertainment image with normal brightness and contrast.

In this case, since the user has to adjust the picture quality whenever the genre of the image changes, the display device 100 may provide a function of automatically adjusting the picture quality according to the genre of the image.

To this end, first, the display device 100 may classify of the genre of the image. In detail, the controller 170 may analyze an image to classify a genre of the image, and in this case, a deep learning model trained through an artificial neural networks may be used Even if the display device 100 analyzes an image to classify of a genre of the image, the classified genre may not be an actual genre, and in this case, there may be a problem in that the image is output by adjusting the picture quality not to match the genre. Accordingly, the present disclosure may provide the display device 100 for more accurately determining the genre of the image.

The picture quality expected by the user may be changed according to the user's individual preference as well as the genre of the image. For example, some users may want to see all images clearly, while others may want to reduce power consumption by slightly lowering the picture quality of the image.

As such, in spite of different picture quality preferred by each user, when the display device 100 consistently adjusts the picture quality in consideration of only the genre of the image, the image with picture quality being adjusted, may be output against the user's intention. Accordingly, the present disclosure may provide the display device 100 for adjusting picture quality according to the user's intention.

Figure 5:
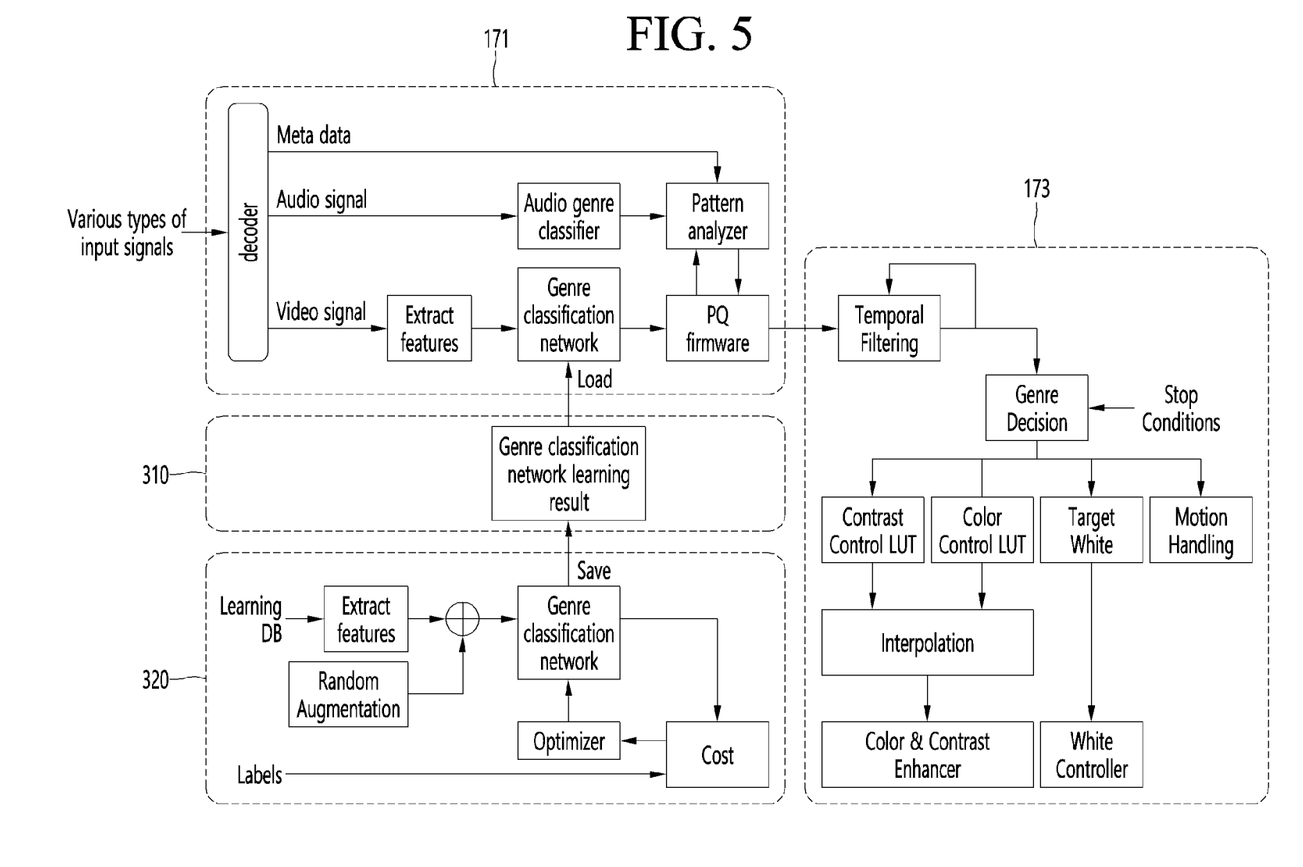
FIG. 5 is a block diagram showing a genre classifier and a picture quality enhancement engine of a display device according to an embodiment of the present disclosure.

FIG. 5 is a block diagram showing a genre classifier and a picture quality enhancement engine of a display device according to an embodiment of the present disclosure.

The display device 100 according to an embodiment of the present disclosure may include a genre classifier 171 and a picture quality adjuster 173. The genre classifier 171 and the picture quality adjuster 173 may each be one component of the controller 170. However, in some embodiments, the genre classifier 171 and the picture quality adjuster 173 may also be included as a separate component from the controller 170 in the display device 100. Hereinafter, it may be assumed that each of the genre classifier 171 and the picture quality adjuster 173 belongs to the controller 170.

The genre classifier 171 may classify a genre of an image. The controller 170 may receive an image signal through the broadcast reception module 130, the external device interface 135, the wireless communication interface 173, or the like, and the genre classifier 171 may classify a genre of an image based on the received image signal.

In detail, when receiving an image signal, a decoder may extract meta data, an audio signal, and a video signal from the image signal. The image signal may include at least one of meta data, an audio signal, or a video signal.

Here, the meta data may refer to attribute information of the image signal and may include an electronic program guide (EPG). The EPG may include information such as time, title, channel, genre, etc. of a broadcast program.

The audio signal may be a signal in an audio range, and may be a signal obtained by converting voice and all natural sounds in an audible frequency range into an electrical waveform signal.

The video signal may be a signal that informs the color, brightness, and position of each point on a screen, and may be an electrical image signal that converts a moving picture taken by a camera into an electrical waveform signal.

The genre classifier 171 may classify the received image signal into meta data, an audio signal, and a video signal using the decoder.

The genre classifier 171 may classify the genre of the image based one at least one of the meta data, the audio signal, or the video signal.

In detail, the genre classifier 171 may detect the genre of the image through the EPG when the meta data, for example, the EPG includes the genre of the image.

The genre classifier 171 may detect the genre of the image based on the audio signal through the audio genre classifier. In detail, the genre classifier 171 may detect the genre of the image as news, a movie, music, a standard, etc. based on the audio signal. For example, the genre classifier 171 may detect the genre of the image as news when human voice is recognized as a size within a predetermined range in an audio signal for more than a predetermined time, when a human voice, a sound effect, etc. are mixed in the audio signal, the genre classifier 171 may detect the genre of the image is detected as news, when a melody is contained in the audio signal, the genre classifier 171 may detect the genre of the image as music, and when the genre of the image does not belong to any one of news, movie, and music, the genre classifier 171 may detect the genre of the image as a standard, but the detection method is merely exemplary.

The genre classifier 171 may detect the genre of the image based on the video signal. In detail, the genre classifier 171 may classify the genre of the image into cartoons, movies, dramas, sports, etc. based on the video signal. For example, if the secondary color of a setting reference or more is included in the video signal, the genre of the image may be detected as a cartoon, and when a person is detected in the video signal, the genre of the image may be detected as a movie or a drama according to the resolution of the image, and when movement of people within a predetermined place is detected in the signal, the genre of the image may be detected as sports.

According to an embodiment of the present disclosure, the genre classifier 171 may detect the genre of the image using the brightness and hue information of the image.

Figure 6:
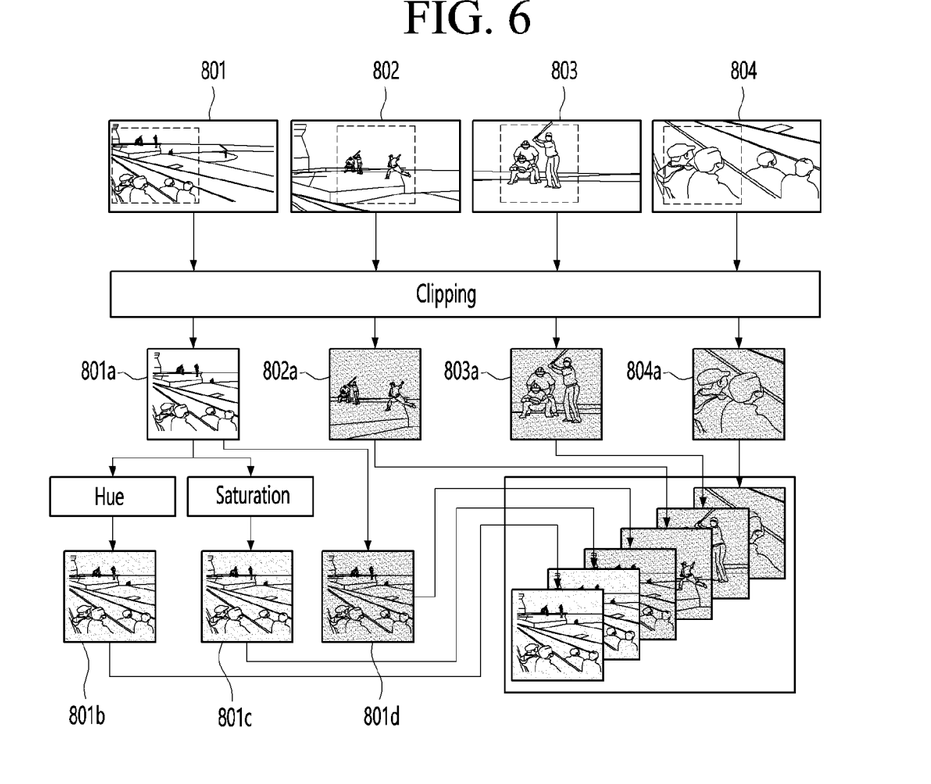
FIG. 6 is an example diagram for explaining a method of detecting a genre of an image using brightness and hue information of an image by a display device according to an embodiment of the present disclosure.

FIG. 6 is an example diagram for explaining a method of detecting a genre of an image using brightness and hue information of an image by a display device according to an embodiment of the present disclosure.

The minimum information for the genre classifier 171 to classify the genre of the image based on the video signal may be brightness and hue information of the image.

In detail, the genre classifier 171 may acquire one frame for every n frames in the video signal. For example, the controller 170 may acquire an nth frame image 801, a 2nth frame image 802, a 3nth frame image 803, a 4nth frame image 804, and the like from the video signal.

The genre classifier 171 may acquire first to fourth clipping images 801a, 802a, 803a, and 804a by cutting out only a portion of each of the plurality of frame images 801 to 804. In this case, the first clipping image 801a may be an image converted to a YCbCr color space, and each of the second to fourth clipping images 802a, 803a, and 804a may be an image expressed only by Y (brightness component). The genre classifier 171 may extract only hue information Cb and Cr from the first clipping image 801a, may then acquire an image 801b expressed with hue, may acquire an image 801c expressed with saturation, and may acquire an image 801d expressed only with a brightness component (Y). The genre of the image may be detected based on the hue image 801b, the saturation image 801c, and the brightness image 801d extracted from the first frame image 801, and the brightness images 802a, 803a, and 804a that are extracted from the second to fourth frame images 802 to 804, respectively.

That is, the genre classifier 171 may acquire specific frame images from an image and may then detect the genre of the image based on a change in hue, saturation, and brightens of frame images.

The method of detecting the genre of the image shown in FIG. 6 is only an example, and the genre classifier 171 may analyze a type of the image through various methods.

For example, the genre classifier 171 may also analyze the type of the image in consideration of a high-frequency component, a motion component, a frequency of scene change, text information, etc. as well as brightness and hue information of the image.

According to another embodiment, the genre classifier 171 may extract features from the video signal and may detect the genre of the image using the features extracted from a genre classification network. In this case, the genre classification network may use results learned through the artificial neural network. In detail, the genre classifier 171 may receive the learning result of the genre classification network from an external server 310 and may detect the genre of the image using the received learning result of the genre classification network. In this case, the learning result of the genre classification network of the external server 310 may be data learned and stored from an external learning engine 320. The external learning engine 320 may learn a model for detecting the genre of each image by using features and labeled information extracted from images included in the learning DB. In this case, the external learning engine 320 may extract features in various patterns through random augmentation to learn images that are not included in a learning DB and may learn a model for detecting the genre of each image. The genre classifier 171 may detect the genre using the features extracted from the video signal through the model learned in the same way as described above.

The genre detection methods according to the above-described embodiments may be implemented individually or in combination.

As such, the genre classifier 171 may pattern-analyze genres of images detected in at least one of meta data, an audio signal, or a video signal, and may then classify the genres into one genre. The genre classifier 171 may input the classified genre to the picture quality adjuster 173.

The picture quality adjuster 173 may adjust picture quality of an image to be output from the display 180 based on the genre input from the genre classifier 171.

First, the picture quality adjuster 173 may perform temporal filtering on the genre classified by the genre classifier 171. The temporal filtering may mean determining whether the currently input genre is temporally appropriately classified. For example, the picture quality adjuster 173 may determine the genre as sports rather than news when news is temporarily input as the genre of the image while sports are continuously input as the genre of the image. As such, the picture quality adjuster 173 may determine the genre of the image through temporal filtering, without directly determining the genre classified by the genre classifier 171 as the genre of the image.

The picture quality adjuster 173 may determine the genre of the image by correcting the genre classified in the genre classifier 171 to another genre when the genre classified in the genre classifier 171 is a genre classified in an unstable classification condition (a Stop Condition), which will be described in detail with reference to FIGS. 7 and 8.

The picture quality adjuster 173 may finally determine the genre of the image based on the genre classified from the genre classifier 171, and may control contrast, saturation, white balance, motion, etc. according to the determined genre of the image to adjust picture quality of an image to be output from the display 180. The picture quality adjuster 173 may correct a picture quality enhancement degree in consideration of the picture quality preset by the user, which will be described in detail with reference to FIGS. 7 to 9.

Figure 7:
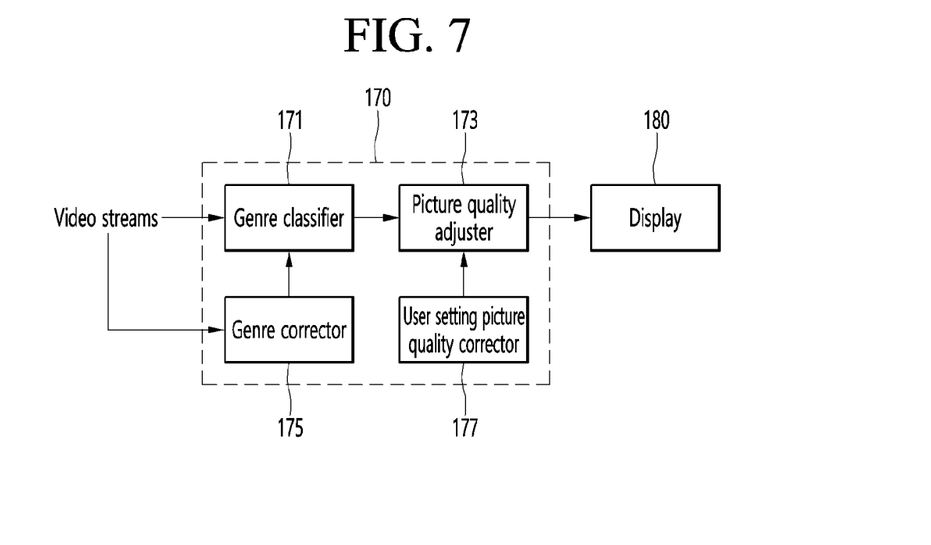
FIG. 7 is a block diagram showing a detailed configuration of a controller and a display of a display device according to an embodiment of the present disclosure.

Then, FIG. 7 is a block diagram showing a detailed configuration of a controller and a display of a display device according to an embodiment of the present disclosure.

When receiving an image signal, the controller 170 may control the genre classifier 171 to classify the genre of the image, and may control the picture quality adjuster 173 to adjust the picture quality of the image based on the classified genre, and the display 180 may display an image with picture quality being adjusted through the picture quality adjuster 173. That is, the controller 170 may determine the genre of the image and the picture quality information to be output accordingly, and the display 180 may display the image with picture quality being adjusted according to the genre or picture quality information determined by the controller 170.

The controller 170 may further include a genre corrector 175 and a user setting picture quality corrector 177 together with a genre classifier 181 and the picture quality adjuster 173. However, the detailed configurations of the controller 170 shown in FIG. 7 are merely separated for convenience of description, and two or more configurations may be combined.

The genre corrector 175 may receive a video signal in the same way as the genre classifier 171. The genre corrector 175 may determine whether the current scene corresponds to the unstable classification condition based on the video signal.

The unstable classification condition may mean that the genre classification according to the video signal is unstable. That is, the unstable classification condition may mean a state in which the accuracy of the genre classified by the genre classifier 181 is predicted to be low. For example, the unstable classification condition may mean a state in which there is little movement in an image, a state in which the image is excessively dark, or a state in which the image is excessively bright.

Thus, when determining that the current scene is in a static state, the genre corrector 175 may recognize that the current scene corresponds to the unstable classification condition. A method of determining whether the current scene is in a static state may be as follows. For example, the genre corrector 175 may compare the current frame and the n previous frames (n being 1 or more). As a result of comparing the image data of the current frame and image data of the n previous frames, the genre corrector 175 may determine the current scene as a static state when there are a predetermined number of pixels with a difference in the image data, which is equal to or greater than a setting value. However, the method of determining whether the current scene is in a static state is merely exemplary, and other various methods may be used.

The genre corrector 175 may recognize that the current scene corresponds to the unstable classification condition when a dynamic range (DR) of the current scene is smaller than a preset reference value.

The dynamic range (DR) may mean a ratio between a maximum value and a minimum value of a brightness value. That is, a smaller DR may mean a narrower image brightness width, and a larger DR may mean a larger image brightness width. Accordingly, when the DR of the current scene is smaller than a preset reference value, the genre corrector 175 may predict that the current scene is excessively bright or excessively dark, and thus may recognize that the current scene corresponds to the unstable classification condition. Likewise, the method of determining whether the current scene is excessively bright or excessively dark is merely exemplary, and various other methods may be used.

As described above, the genre corrector 175 may determine whether the current scene is the unstable classification condition. As such, the display device 100 may advantageously compensate for inaccurate results of genre detection using brightness and hue information of an image or genre detection through a learning model. That is, the display device 100 may advantageously increase the reliability of a product by reducing the inaccuracy of genre detection by determining the unstable classification condition.

When the current scene corresponds to the unstable classification condition, the genre corrector 175 may correct the classified genre.

Hereinafter, a method of correcting a genre by the genre corrector 175 will be described.

When the current scene corresponds to the unstable classification condition, the genre corrector 175 may correct the classified genre. That is, when the current scene corresponds to the unstable classification condition, the genre corrector 175 may correct the genre classified by the genre classifier 171 to another genre.

According to an embodiment, the genre corrector 175 may correct a genre of an image to a previously determined genre. For example, when the previously determined genre is sports, the genre corrector 175 may correct the genre of the image to sports instead of the genre classified by the genre classifier 171. In this case, when the current scene is the unstable classification condition, the possibility of being changed to a genre of the image suitable for the current scene may be advantageously improved. In detail, since the genre of the image is changed from advertisements broadcast for a short time as a starting point, there is a high probability that the image of the previously determined genre continues to be broadcast, except when advertisements are broadcast, and accordingly, the case in which the genre is incorrectly determined may be minimized by correcting the previously determined genre in the unstable classification condition.

According to another embodiment, the genre corrector 175 may correct the genre of the image to a preset default genre. For example, when the preset default genre is a drama, the genre corrector 175 may the genre of the image to a drama instead of the genre classified by the genre classifier 171.

According to another embodiment, the genre corrector 175 may correct the genre of the image to the previously determined genre, and when there is no previously determined genre, the genre corrector 175 may correct the genre of the image to a preset default genre. In this case, when the current scene is in an unstable classification condition, the possibility of being changed to a genre of the image suitable for the current scene is improved, and simultaneously the case in which there is no previously determined genre may be advantageously supplemented.

When the genre corrector 175 corrects the genre of the image, the corrected genre may be transmitted to the genre classifier 171. The genre classifier 171 may determine the corrected genre as the genre of the image. The genre classifier 171 may transmit the determined genre to the picture quality adjuster 173.

The picture quality adjuster 173 may determine picture quality information based on the genre received from the genre classifier 171.

The picture quality information may include a setting value for each of light and shade, brightness, sharpness, color density, contrast, etc., and in this case, light and shade, brightness, sharpness, color density, contrast, etc. may be a picture quality variable. That is, picture quality may be determined by the picture quality variable.

The storage 140 may pre-store picture quality information corresponding to each genre of the image. For example, the storage 140 may store first picture quality information corresponding to a first genre, second picture quality information corresponding to a second genre, and third picture quality information corresponding to a third genre.

Thus, according to an embodiment, the picture quality adjuster 173 may determine picture quality information by acquiring picture quality information corresponding to the determined genre from the storage 140.

When receiving the picture quality information from the picture quality adjuster 173, the display 180 may adjust the picture quality of the image according to the received picture quality information and may display the image.

With respect to a genre of the same image, picture quality preferred by the user may be changed. Thus, when the picture quality is preset by the user, the user setting picture quality corrector 177 may correct a picture quality enhancement degree based on the preset picture quality. That is, when the picture quality is preset by the user, the user setting picture quality corrector 177 may determine a picture quality adjustment range based on the preset picture quality.

The picture quality enhancement degree may refer to picture quality information adjusted according to a genre of an image. That is, as the picture quality enhancement degree increases, picture quality variables may be adjusted to be high, and as the picture quality enhancement degree is reduced, picture quality variables may be adjusted to be low.

The picture quality adjustment range may refer to a picture quality range to picture quality of a genre with the highest picture quality from picture quality of a genre with the lowest picture quality.

Accordingly, the user setting picture quality corrector 177 may adjust the picture quality information of the genre with the lowest picture quality to be higher as the preset picture quality is increased. In addition, the user setting picture quality corrector 177 may determine a higher picture quality adjustment range as the preset picture quality is increased, which will be described in more detail with reference to FIG. 9.

Figure 8:
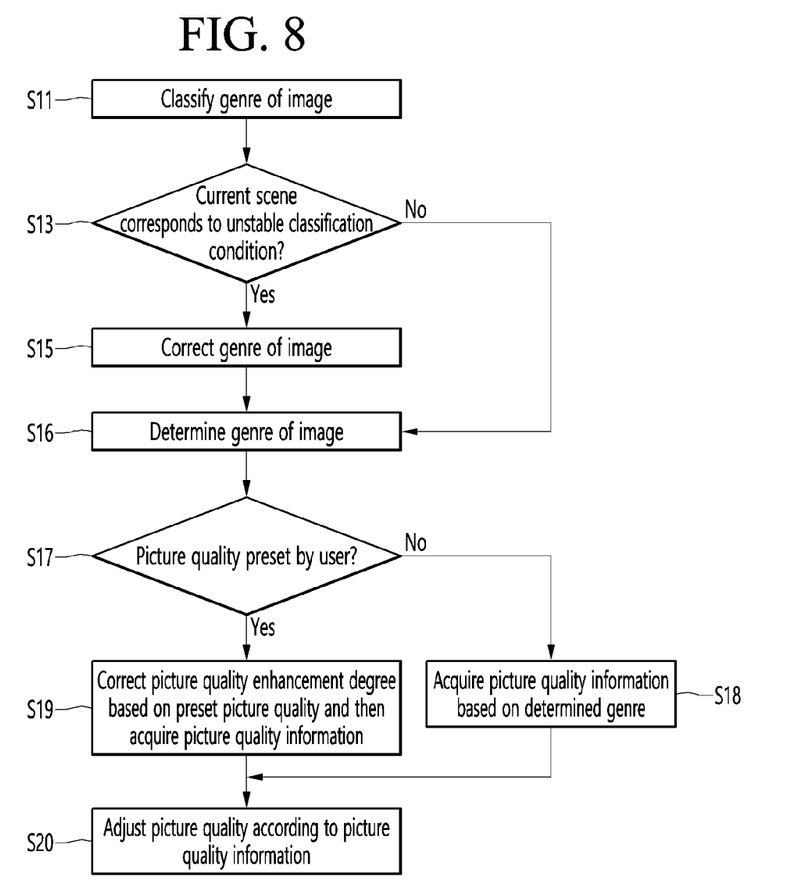
FIG. 8 is a flowchart showing an operation method of a display device according to an embodiment of the present disclosure.

FIG. 8 is a flowchart showing an operation method of a display device according to an embodiment of the present disclosure.

The controller 170 may classify a genre of an image (S11).

The controller 170 may classify the genre of the image through the genre classifier 171.

The controller 170 may determine whether the current scene corresponds to an unstable classification condition (S13).

The controller 170 may determine whether the current scene corresponds to the unstable classification condition through the genre corrector 175. The unstable classification condition has been described in detail above, and a repeated explanation will be omitted.

When the current scene corresponds to the unstable classification condition, the controller 170 may correct the genre of the image (S15) and may determine the corrected genre as the genre of the image (S16).

When the current scene corresponds to the unstable classification condition, the controller 170 may determine the genre transmitted from the genre corrector 175 as the genre of the image.

When current scene does not correspond to the unstable classification condition, the controller 170 may determine the genre classified in operation S11 as the genre of the image (S16).

When current scene does not correspond to the unstable classification condition, the controller 170 may determine the genre classified by the genre classifier 171 as the genre of the image.

The controller 170 may acquire picture quality information corresponding to the determined genre and may then control the display 180 to output an image, the picture quality is adjusted according to the acquired picture quality information.

The controller 170 may determine whether picture quality is preset by the user (S17).

The user may preset a setting value for at least one of light and shade, brightness, sharpness, color density, or contrast for the display device 100. The controller 170 may determine that the picture quality is preset by the user when at least one of light and shade, brightness, sharpness, color density, or contrast is preset. In more detail, the controller 170 may recognize higher picture quality as the setting value for each of light and shade, brightness, sharpness, color density, and contrast is increased, and may recognize lower picture quality as the setting value for each of light and shade, brightness, sharpness, color density, and contrast is reduced.

When the picture quality is not preset by the user, the controller 170 may acquire picture quality information based on the determined genre (S18).

When the picture quality is not preset by the user, the controller 170 may acquire picture quality information corresponding to the determined genre. That is, the controller 170 may acquire the picture quality information corresponding to the genre determined in operation S16 from the storage 140.

When the picture quality is preset by the user, the controller 170 may correct a picture quality enhancement degree based on the preset picture quality and may then acquire picture quality information (S19).

Hereinafter, with reference to FIG. 9, a method of correcting a picture quality enhancement degree based on user selected picture quality (PQ) by a display device according to an embodiment of the present disclosure will be described.

Figure 9:
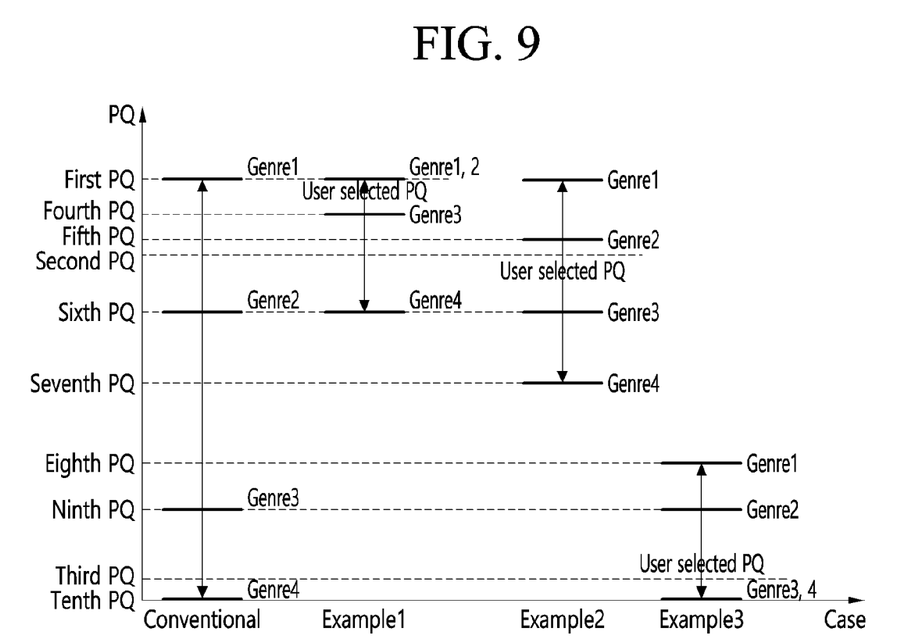
FIG. 9 is an example diagram showing a method of correcting a picture quality enhancement degree based on preset picture quality by a display device according to an embodiment of the present disclosure.

FIG. 9 is an example diagram showing a method of correcting a picture quality enhancement degree based on preset picture quality by a display device according to an embodiment of the present disclosure.

In a graph shown in FIG. 9, a horizontal axis indicates each case for explaining an example of a correction method of a picture quality enhancement degree, and a vertical axis indicates picture quality. That is, the vertical axis may mean that the picture quality enhancement degree is increased upward.

The conventional case may be the state in which picture quality is not preset by a user. In this case, the picture quality adjustment range may be from picture quality corresponding to genre 1 to picture quality corresponding to genre 4. Each of the picture quality corresponding to genre 1, the picture quality corresponding to genre 2, the picture quality corresponding to genre 3, and the picture quality corresponding to genre 4 may be picture quality determined from the picture quality information stored in the storage 140.

With regard to Example 1 to Example 3 in which picture quality is preset, the picture quality set by the user in Example 1 is first picture quality (first PQ), the picture quality set by the user in Example 2 is second picture quality (second PQ), the picture quality set by the user in Example 3 is third picture quality (third PQ), the first PQ may be higher than the second PQ, and the second PQ may be higher than the third PQ. In addition, the first PQ may be the highest settable picture quality.

First, referring to Example 1, when the preset picture quality is the first PQ, the controller 170 may determine the picture quality adjustment range as a range from the first PQ to sixth PQ. In this case, the controller 170 may correct a picture quality enhancement degree in such a way that picture quality corresponding to each of the first and second genres is the first PQ, picture quality corresponding to the third genre is the fourth PQ, picture quality corresponding to the fourth genre is the sixth PQ. For example, when the genre of the image is the second genre, the controller 170 may correct the picture quality enhancement degree to adjust picture quality to the sixth PQ in the state in which the picture quality is not preset and to adjust the picture quality to the first PQ in the state in which the picture quality is preset to the first PQ.

Then, referring to Example 2, when the preset picture quality is the second PQ, the controller 170 may determine the picture quality adjustment range as a range from the first PQ to seventh PQ. In this case, the controller 170 may correct the picture quality enhancement degree in such a way that picture quality corresponding to the first genre is the first PQ, picture quality corresponding to the second genre is the fifth PQ, picture quality corresponding to the third genre is the sixth PQ, and picture quality corresponding to the fourth genre is seventh PQ. For example, when the genre of the image is the second genre, the controller 170 may correct the picture quality enhancement degree to adjust the picture quality to the sixth PQ in a state in which the picture quality is not preset and to adjust the picture to the fifth PQ in a state in which the picture quality is the second PQ.

Referring to Example 3, when the preset picture quality is the third PQ, the controller 170 may determine the picture quality adjustment range as a range from the eighth PQ to the tenth PQ. In this case, the controller 170 may correct the picture quality enhancement degree in such a way that picture quality corresponding to the first genre is the eighth PQ, picture quality corresponding to the second genre is the ninth PQ, and picture quality corresponding to the third and fourth genres is the tenth PQ. For example, when the genre of the image is the second genre, the controller 170 may correct the picture quality enhancement degree to adjust the picture quality to the sixth PQ in a state in which the picture quality is not preset and to adjust the picture quality to the ninth picture quality when the picture quality is preset to the third PQ.

In summary, the controller 170 may determine a higher picture quality adjustment range as the preset picture quality is improved, and may determine a lower picture quality adjustment range as the preset picture quality is lowered. Referring to Examples 1 and 2 of FIG. 9, when the preset picture quality is the first PQ (Example 1), the controller 170 may adjust the picture quality of the fourth genre having the lowest picture quality to the sixth PQ, and when the preset picture quality is the second picture quality (Example 2), the controller 170 may adjust the picture quality to be higher than the seventh PQ that is picture quality of the fourth genre having the lowest picture quality.

Referring to Examples 2 and 3 of FIG. 9, when the preset picture quality is the second PQ (Example 2), the controller 170 may adjust the picture quality of the fourth genre having the lowest picture quality to the seventh PQ, and when the preset picture quality is the third PQ (Example 3), the controller 170 may adjust the picture quality to be higher than the eighth PQ that is picture quality of the first genre having the lowest picture quality.

That is, the controller 170 may adjust the picture quality differently according to the preset picture quality in spite of images of the same genre. In addition, the controller 170 may adjust picture quality to display the image with low picture quality according to the user's preference even if an image with high picture quality is recommended.

As such, the display device 100 has an advantage of flexibly adjusting picture quality based on the user's subjective preference for picture quality.

As described above, the controller 170 may correct picture quality enhancement information, and when correcting the picture quality enhancement information, the controller 170 may acquire picture quality information corresponding to the corrected picture quality.

Again, FIG. 8 is described.

The controller 170 may adjust picture quality according to the picture quality information (S20).

That is, the controller 170 may control the display 180 to display an image with picture quality being adjusted according to the picture quality information.

According to an embodiment, as described above with reference to FIG. 8, the display device 100 may correct the genre of the image according to whether the current scene corresponding to an unstable classification condition or may correct the picture quality enhancement degree according to the picture quality is preset by the user.

According to another embodiment, the display device 100 may omit operations S17 to S19. That is, the display device 100 may determine whether to correct the genre of the image according to whether the current scene corresponds to the unstable classification condition, only the genre of the image is determined accordingly, and the degree of picture quality enhancement may not be separately corrected.

According to another embodiment, the display device 100 may omit operations S13 to S16. That is, the display device 100 may determine whether to correct the picture quality enhancement degree according to whether the picture quality is preset by the user, only the genre of the image is determined accordingly, and the classified genre of the image may not be separately corrected.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications may be made.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
a controller configured to:
classify a genre of a received image, and adjust picture quality of the received image; and a display configured to display the received image with picture quality being adjusted, wherein the controller is configured to acquire a plurality of clipping images by cutting out a portion of each of frame images, wherein the first clipping image is an image converted to a YCbCr color space, and residual clipping images are an image expressed by Y representing a brightness component, wherein the controller is configured to acquire a first image expressed with hue, a second image expressed with saturation and a third image expressed by Y after extracting hue information Cb and Cr from the first clipping image, wherein the controller is configured to determine the genre of the received image based on both the first to third images acquired from the first clipping image and bright images acquired from the residual clipping images, and wherein the controller is further configured to perform temporal filtering on the classified genre of the received image to determine whether the genre is temporally classified and correct the classified genre of the received image by controlling the controller, wherein, when a picture quality of the corrected genre of the received image is different from a picture quality preset by a user, the controller is configured to control the picture quality of the corrected genre of the received image to be corrected based on the preset picture quality automatically.

2. The display device of claim 1, wherein, when a current scene of the received image corresponds to an unstable classification condition, the controller is configured to correct the classified genre.

3. The display device of claim 2, wherein, when determining that the current scene is in a static state, the controller is configured to recognize that the current scene corresponds to the unstable classification condition.

4. The display device of claim 2, wherein, when a dynamic range (DR) of the current scene is smaller than a preset reference value, the controller is configured to recognize that the current scene corresponds to the unstable classification condition.

5. The display device of claim 1, wherein, in a state in which picture quality is preset by a user, the controller is configured to determine a picture quality adjustment range based on the preset picture quality.

6. The display device of claim 5, wherein the controller is configured to determine the picture quality adjustment range to be higher as the preset picture quality is improved.

7. The display device of claim 1, wherein the controller is configured to adjust picture quality information of a genre having lowest picture quality to be higher as the preset picture quality is improved.

8. The display device of claim 1, wherein, when an image as a second genre of the received image is temporarily input while images as the first genre of the received image are continuously input, the controller is further configured to maintain the genre of the received image as the first genre through temporal filtering.

* * * * *